(12) United States Patent
Cuerrier et al.

(10) Patent No.: US 6,932,407 B2
(45) Date of Patent: Aug. 23, 2005

(54) VEHICLE CHILD SEAT ATTACHMENT STRUCTURE

(75) Inventors: Jason Cuerrier, Windsor (CA); Mike Smith, Highland, MI (US); Youichi Yamamoto, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 45 days.

(21) Appl. No.: 10/764,471

(22) Filed: Jan. 27, 2004

(65) Prior Publication Data

US 2005/0161969 A1 Jul. 28, 2005

(51) Int. Cl.[7] .............................................. B60R 22/00
(52) U.S. Cl. .................... 296/63; 296/30; 296/193.04; 296/210; 297/253
(58) Field of Search ............................... 296/63, 65.03, 296/68.1, 30, 193.08, 203.04, 210; 297/250.1, 297/254, 253; 280/801.1, 801; 248/503.1

(56) References Cited

U.S. PATENT DOCUMENTS

| | | | |
|---|---|---|---|
| 6,224,129 B1 | 5/2001 | Cisternino et al. | |
| 6,234,572 B1 | 5/2001 | Shiino et al. | |
| 6,450,576 B1 | 9/2002 | Rhein et al. | |
| 6,485,055 B1 | 11/2002 | Swayne et al. | |
| 6,485,102 B1 | 11/2002 | Moffa et al. | |
| 6,499,786 B2 | 12/2002 | Takahashi | |
| 6,634,710 B1 | 10/2003 | Adamson, Sr. et al. | |

*Primary Examiner*—Joseph D. Pape
(74) *Attorney, Agent, or Firm*—Shinjyu Global IP Counselors, LLP.

(57) ABSTRACT

A vehicle child seat attachment structure basically comprises a vehicle body panel and a sheet metal structural member. The sheet metal structural member is fixedly coupled to the vehicle body panel to create a space between the vehicle body panel and a cabin facing portion of the sheet metal structural member. The cabin facing portion of the sheet metal structural member is configured and arranged to form at least a first bar portion of an integrated child seat tether anchor that is arranged and dimensioned to receive a child seat tether clip. The sheet metal structural member is reinforced by a reinforcement plate configured and arranged to form at least a second bar portion of the integrated child seat tether anchor that is arranged and dimensioned to overlie the first bar portion such that the child seat tether clip is fastened around the first and second bar portions.

29 Claims, 8 Drawing Sheets

VEHICLE CHILD SEAT ATTACHMENT STRUCTURE

BACKGROUND OF THE INVENTION

1. Field of the Invention

The present invention generally relates to a vehicle child seat attachment structure. More specifically, the present invention relates to a vehicle child seat attachment structure that forms a child seat tether anchor, which is integrated into a structure support member of a body panel of a vehicle.

2. Background Information

It is desirable to install a child seat on a vehicle seat when children ride in automobiles. Typically, the child seat is attached to the vehicle seat using one of the passenger seat belts. More recently, vehicles have been equipped with additional anchor points to comply with the ISOFIX type child system, which requires two lower child seat anchors and one tether anchor for securing the child seat to the vehicle at three locations. The two lower child seat anchors are coupled to latches provided at the bottom corners of the child seat, while the tether anchor is coupled to a tether that is attached to the upper end of the child seat. The lower child seat anchors are typically inverted U-shaped mounting members that are secured to a cross member of the floor panel that is located just behind the seat. One example of a plurality of lower child seat anchors is disclosed in U.S. Pat. No. 6,499,786. The tether anchor is typically secured to a cross member that is located rearwardly of the vehicle seat. The location of the tether anchor depends upon the construction of the vehicle. For example, a sport utility vehicle often has the tether anchor located on the cross member located at the rear hatch. An example of a tether anchor is disclosed in U.S. Pat. No. 6,485,055.

In view of the above, it will be apparent to those skilled in the art from this disclosure that there exists a need for an improved vehicle child seat attachment structure. This invention addresses this need in the art as well as other needs, which will become apparent to those skilled in the art from this disclosure.

SUMMARY OF THE INVENTION

It has been discovered that using separate tether anchors that are fixed to the vehicle body increases production costs of the vehicle due to the need for additional parts and additional assembly steps to install the separate tether anchors. Moreover, it has been discovered that using separate tether anchors that are fixed to the vehicle body, often requires special covers for the tether anchors when they are not being used.

In view of the foregoing, one object of the present invention is to provide a vehicle child seat attachment structure that reduces production costs and eliminates the need for additional parts and/or additional assembly steps that are required to install the separate tether anchors.

In accordance with one aspect of the present invention, a vehicle child seat attachment structure is provided that basically comprises a vehicle body panel and a first sheet metal structural member. The vehicle body panel is configured and arranged to conform to a contour of a portion of a vehicle cabin. The first sheet metal structural member is fixedly coupled to the vehicle body panel to create a space between the vehicle body panel and a cabin facing portion of the first sheet metal structural member. The cabin facing portion of the first sheet metal structural member is configured and arranged to form at least a first bar portion of an integrated child seat tether anchor that is arranged and dimensioned to receive a child seat tether clip.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
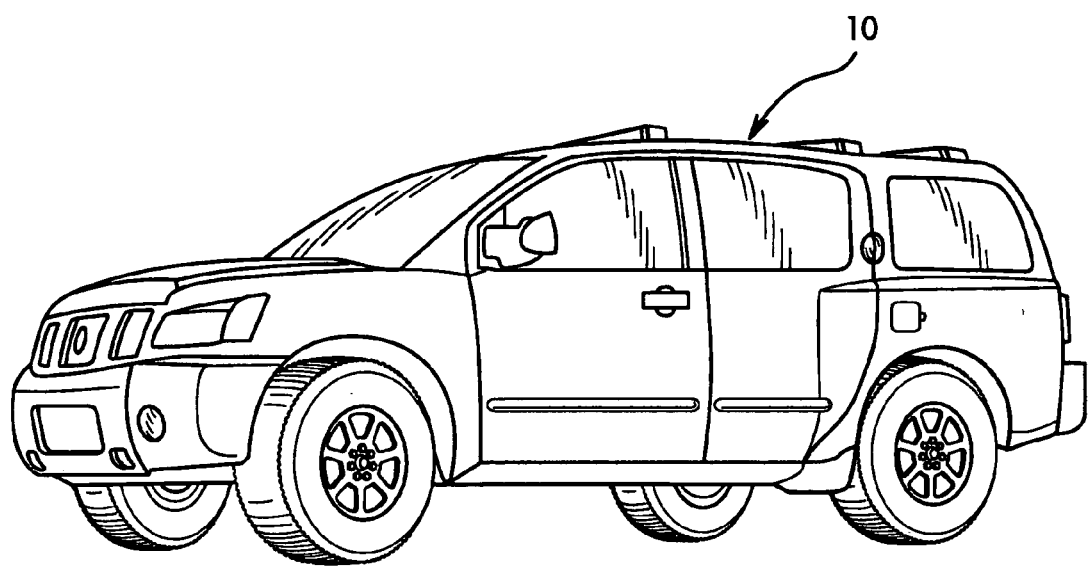
FIG. 1 is a side perspective view of a vehicle equipped with a vehicle child seat tether anchor in accordance with a preferred embodiment of the present invention.
Figure 2:
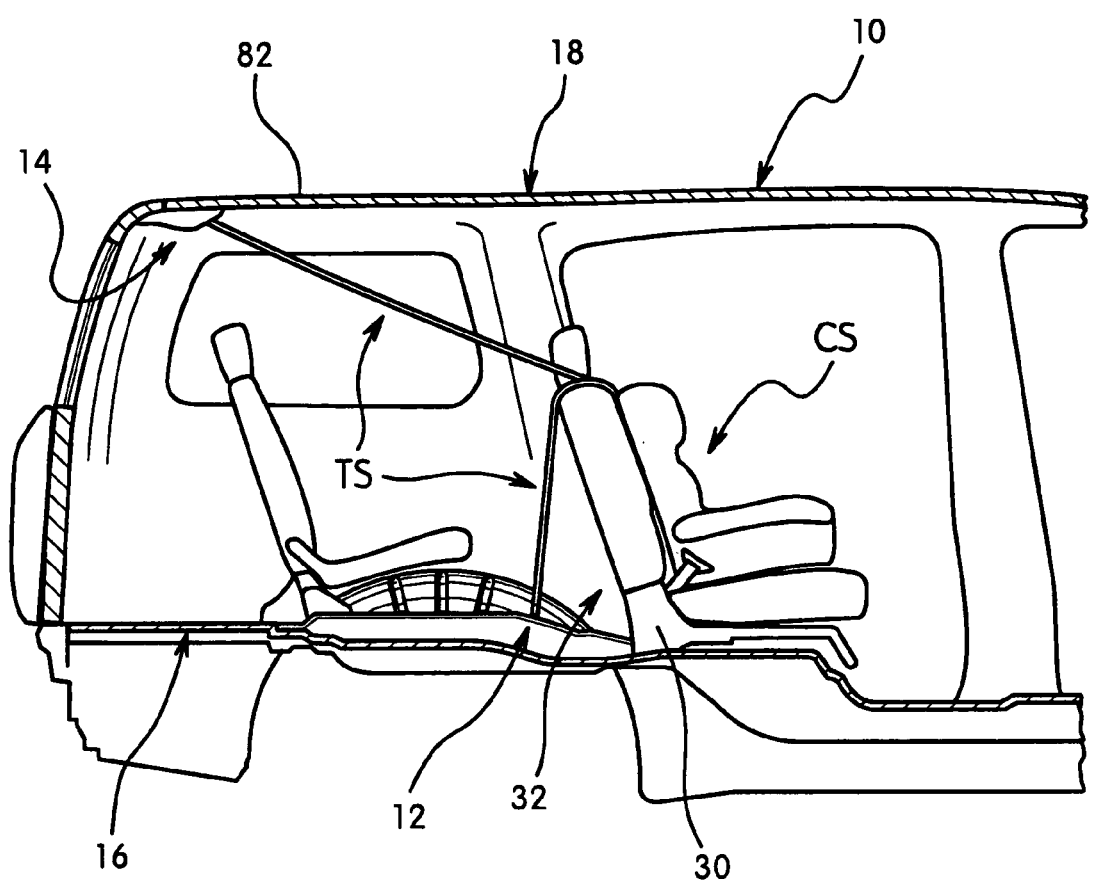
FIG. 2 is a simplified longitudinal view of a portion of the vehicle body for the vehicle illustrated in FIG. 1.
Figure 3:
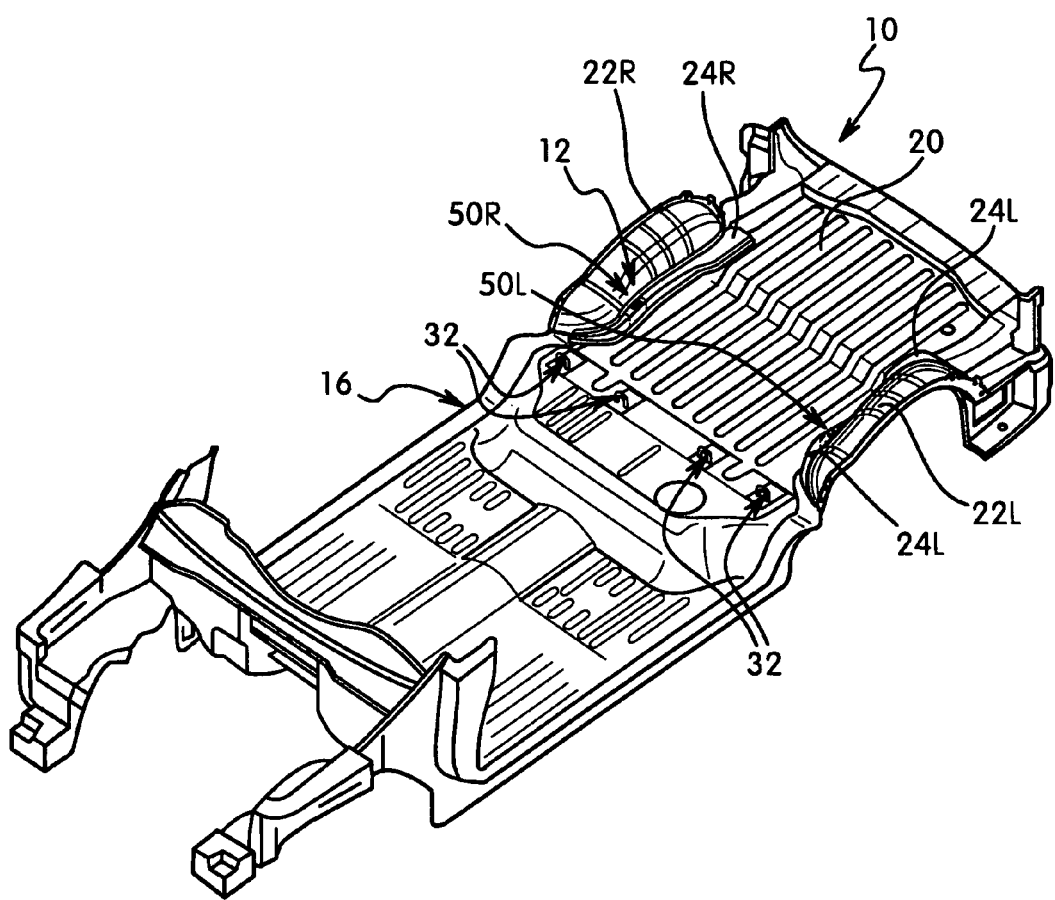
FIG. 3 is a simplified top perspective view of the floor structure of the vehicle body illustrated in FIGS. 1 and 2.

Referring initially to FIGS. 1–3, a portion of a vehicle body 10 is illustrated that is equipped with a pair of vehicle child seat attachment structures 12 and 14 in accordance with a preferred embodiment of the present invention. The vehicle child seat attachment structure 12 is formed as part of a floor structure 16 of the vehicle body 10, while the vehicle child seat attachment structure 14 is formed as part of a roof structure 18 of the vehicle body 10. While the vehicle body 10 is constructed of a plurality of vehicle body panels and a plurality of structural members, for the sake of brevity, only those parts or portions of the vehicle body 10 that are needed to understand the present invention will be discussed and/or illustrated herein. For purposes of illustration, FIG. 2 illustrates each of the vehicle child seat attachment structures 12 and 14 being coupled to the child seat CS by a tether strap TS. However, it will be apparent to those skilled in the art from this disclosure that in actuality only one of the vehicle child seat attachment structures 12 and 14 is typically coupled to the child seat CS by a single one of the tether straps.

Figure 4:
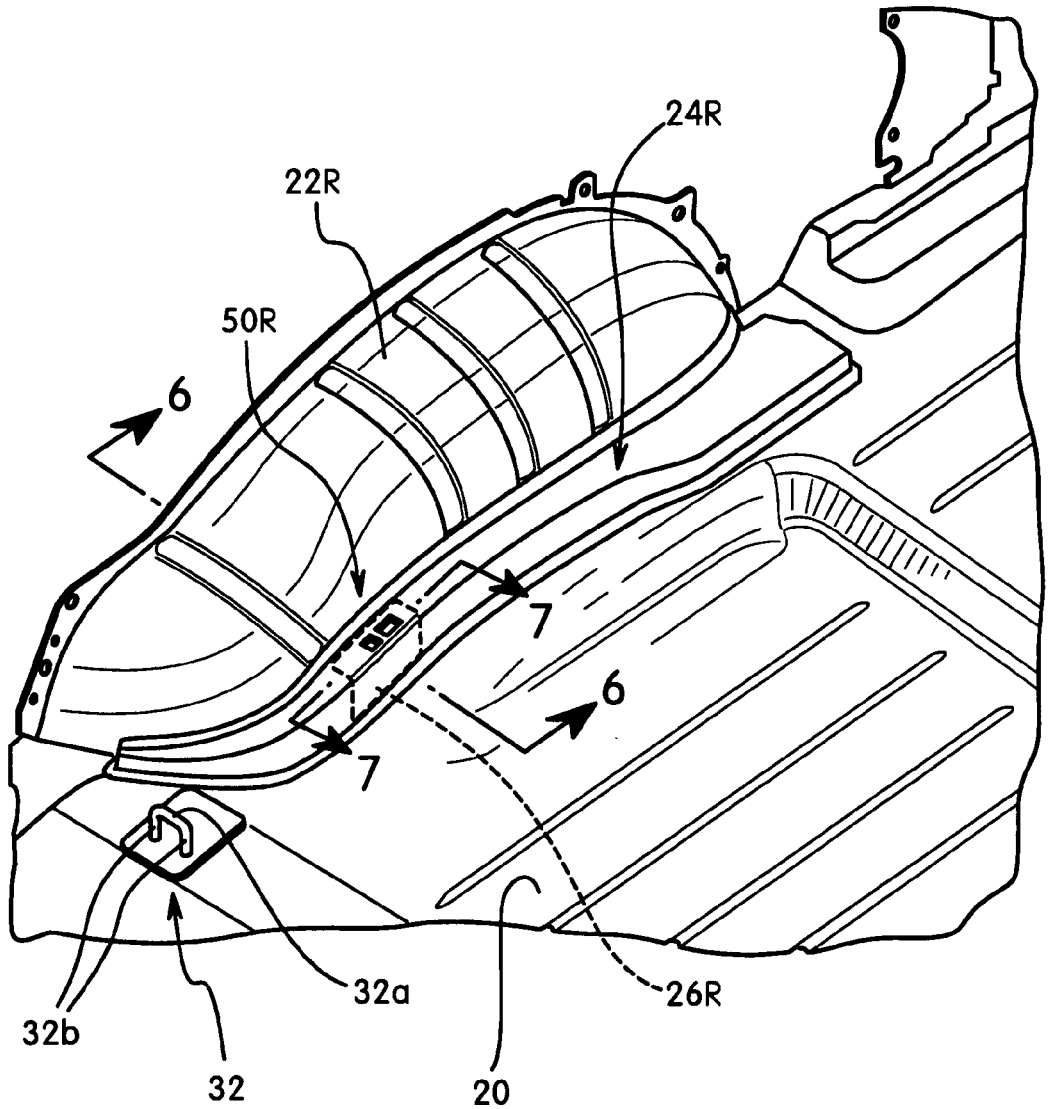
FIG. 4 is an enlarged partial top perspective view of the right side of the floor structure of the vehicle body illustrated in FIGS. 1–3 illustrating the right side integrated child seat tether anchor in accordance with the preferred embodiment of the present invention.
Figure 5:
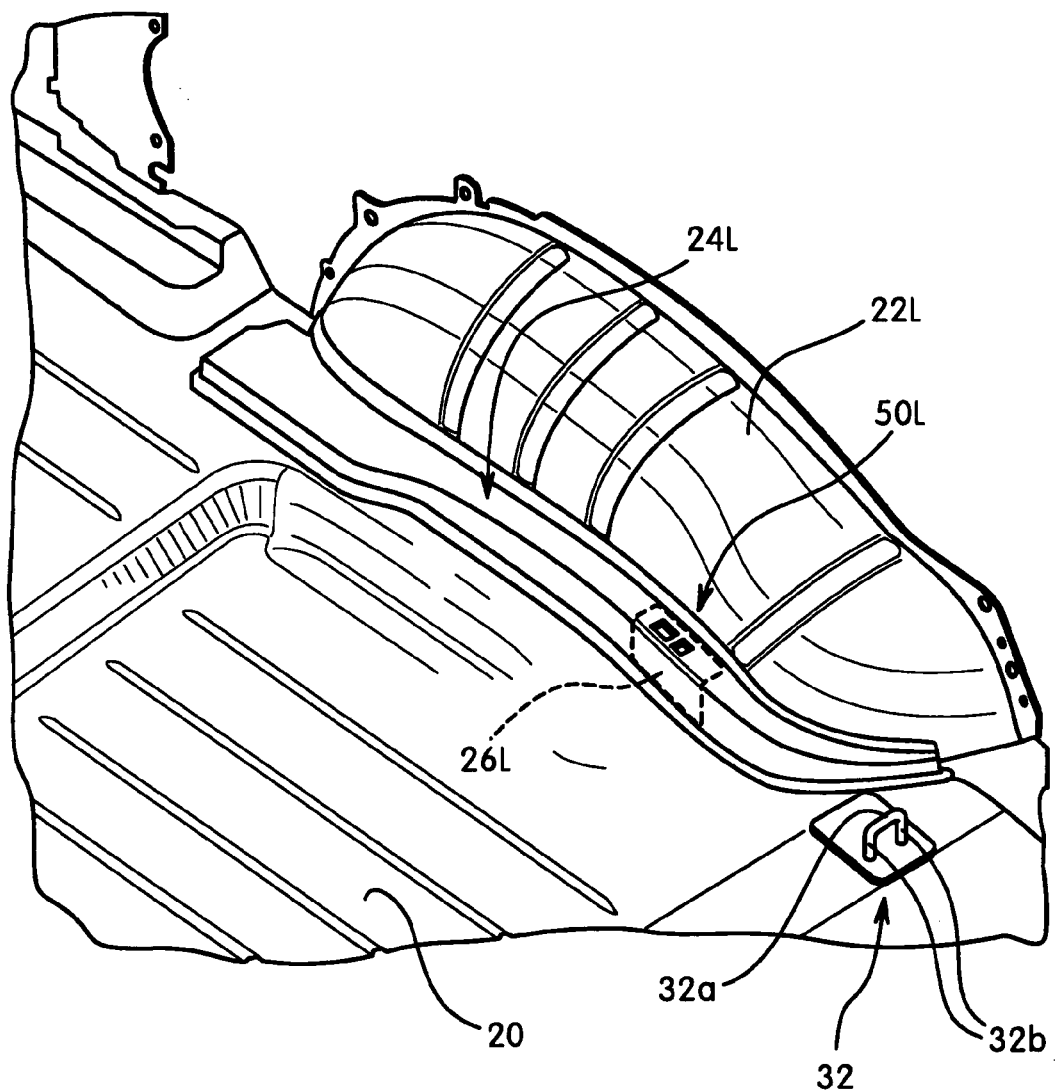
FIG. 5 is an enlarged partial top perspective view of the left side of the floor structure of the vehicle body illustrated in FIGS. 1–3 illustrating the left side integrated child seat tether anchor in accordance with the preferred embodiment of the present invention.

Referring now to FIGS. 3–5, the vehicle child seat attachment structure 12 that is formed as part of the floor structure 16 of the vehicle body 10 will now be discussed. For the sake of simplicity, the vehicle child seat attachment structure 12 will be illustrated with a simplified configuration. Moreover, it will be apparent to those skilled in the art from this disclosure that the child seat attachment structure 12 is dimensioned and configured to conform to the particular structure of the floor structure 16 to which the child seat attachment structure 12 is being formed as an integrated part. In other words, the precise dimensions and configurations of the child seat attachment structure 12 depend on the configuration of the floor structure 16 of the vehicle 10.

The vehicle child seat attachment structure 12 is basically formed by a floor panel 20, a pair of rear wheel wells 22R and 22L, and a pair of (first and second) side structural members 24R and 24L. Preferably, the side structural members 24R and 24L are reinforced with a pair of reinforcement plates 26R and 26L, respectively. Thus, a first side portion of the floor structure 16 of the vehicle body 10 forms a first portion of the vehicle child seat attachment structure 12, while a second side portion of the floor structure 16 of the vehicle body 10 forms a second portion of the vehicle child seat attachment structure 12.

The floor panel 20 is preferably constructed of a sheet metal material that is configured to form a floor of the vehicle body 10. The floor panel 20 has a rear passenger seat 30 fixedly coupled to the upper surface of the floor panel 20 in a conventional manner. The area of the floor panel 20 that is directly behind the rear passenger seat 30 preferably has a plurality of child seat anchors 32. The child seat anchors 32 are fixedly coupled thereto in a conventional manner. For example, one method of affixing child seat anchors is disclosed in U.S. Pat. No. 6,499,786, which is hereby incorporated entirely herein by reference. Of course, the child seat anchors 32 could be also directly attached to the rear passenger seat 30 in a conventional manner. However, in the illustrated embodiment, the child seat anchors 32 are attached to the floor panel 20 and a laterally extending cross structural member (not shown) that is located beneath the floor panel 20.

As best seen in FIGS. 4 and 5, the child seat anchors 32 are preferably substantially inverted U-shaped attachment bars that extend upwardly from the floor panel 20. Each of the child seat anchors 32 has a laterally extending cross bar portion 32a and a pair of leg portions 32b extending downwardly from the cross bar portion 32a to the floor panel 20. Thus, the free ends of the leg portions 32b are fixedly coupled to the floor panel 20. The cross bar portions 32a are configured and arranged to receive corresponding attachment structures of the child seat CS in a conventional manner.

As seen in FIG. 4, the right lateral side edge of the floor panel 20 has the rear wheel well 22R fixedly coupled thereto at a position just behind the area of the rear passenger seat 30. Similarly, as seen in FIG. 5, the left lateral side edge of the floor panel 20 has the left rear wheel well 22L fixedly coupled thereto at a position just behind the rear passenger seat 30. The side structural members 24R and 24L are fixedly coupled between the rear wheel wells 22R and 22L and the corresponding edge portions of the floor panel 20 as seen in FIGS. 4 and 5. Thus, the floor panel 20, the rear wheel wells 22R and 22L and the side structural members 24R and 24L define a pair of side spaces that extend substantially in a longitudinal direction of the vehicle along the rear wheel wells 22R and 22L.

The side structural members 24R and 24L are each preferably one-piece, unitary members constructed from a single piece of sheet metal that is bent and welded between the floor panel 20 and the corresponding one of the rear wheel wells 22R and 22L. In other words, the side structural support members 24R and 24L are the first and second sheet metal structural members that extend in a front to aft vehicle direction of the floor panel 20. The side structural members 24R and 24L are substantially identical to each other, except that they are mirror images of each other. Thus, only the right side structural member 24R will be discussed and illustrated in detail herein.

Figure 6:
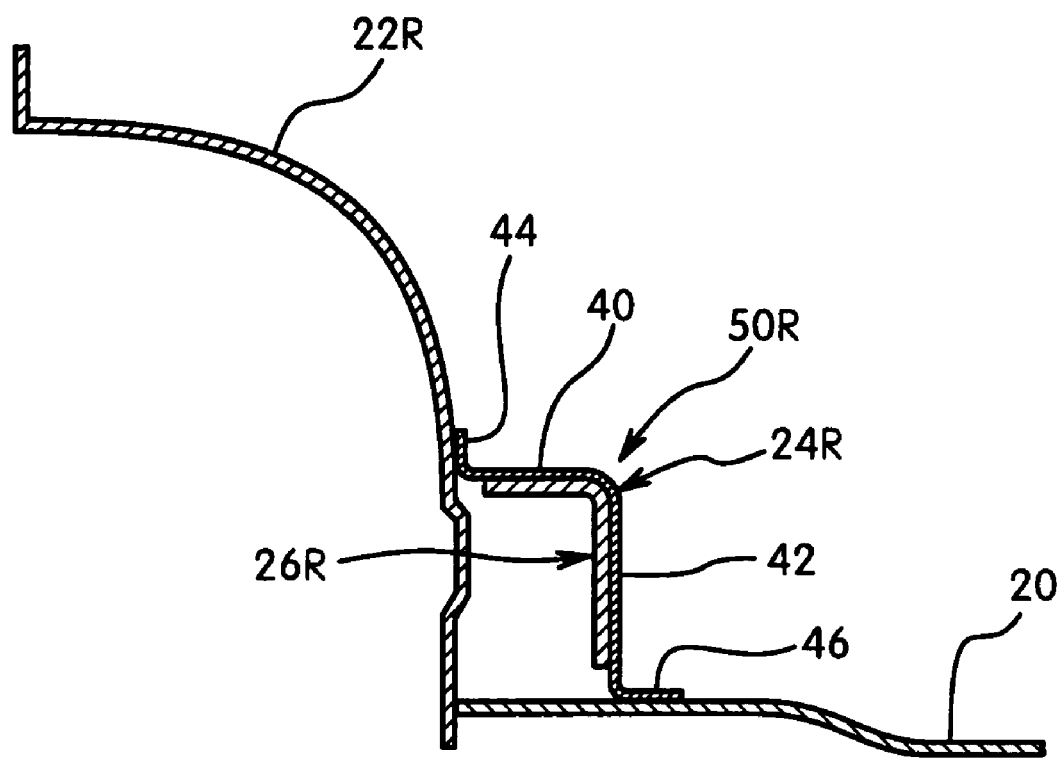
FIG. 6 is a simplified partial cross sectional view of the right side integrated child seat tether anchor in accordance with the preferred embodiment of the present invention as seen along section line 6—6 of FIG. 4.

Basically, as best seen in FIG. 6, the side structural member 24R has a generally horizontally extending support portion 40 and a substantially vertically extending support portion 42. The support portions 40 and 42 preferably are coupled together to form a substantially L-shaped cross section. The side structural member 24R also preferably includes a first mounting flange 44 extending vertically from the support portion 40 for mounting to the rear wheel well 22R, and a second mounting flange 46 extending horizontally from the support portion 42 for fixedly securing the side structural member 24R to the floor panel 20. Preferably, the flanges 44 and 46 are welded to the wheel well 22R and the floor panel 20, respectively, in a conventional manner.

Figure 7:
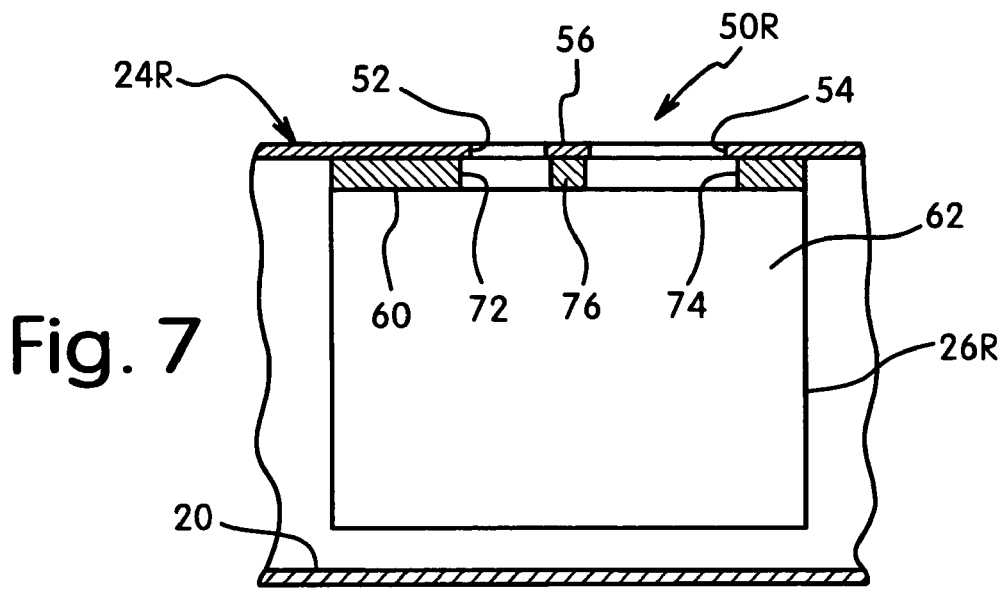
FIG. 7 is a simplified partial cross sectional view of the right side integrated child seat tether anchor in accordance with the preferred embodiment of the present invention as seen along section line 7—7 of FIG. 4.
Figure 8:
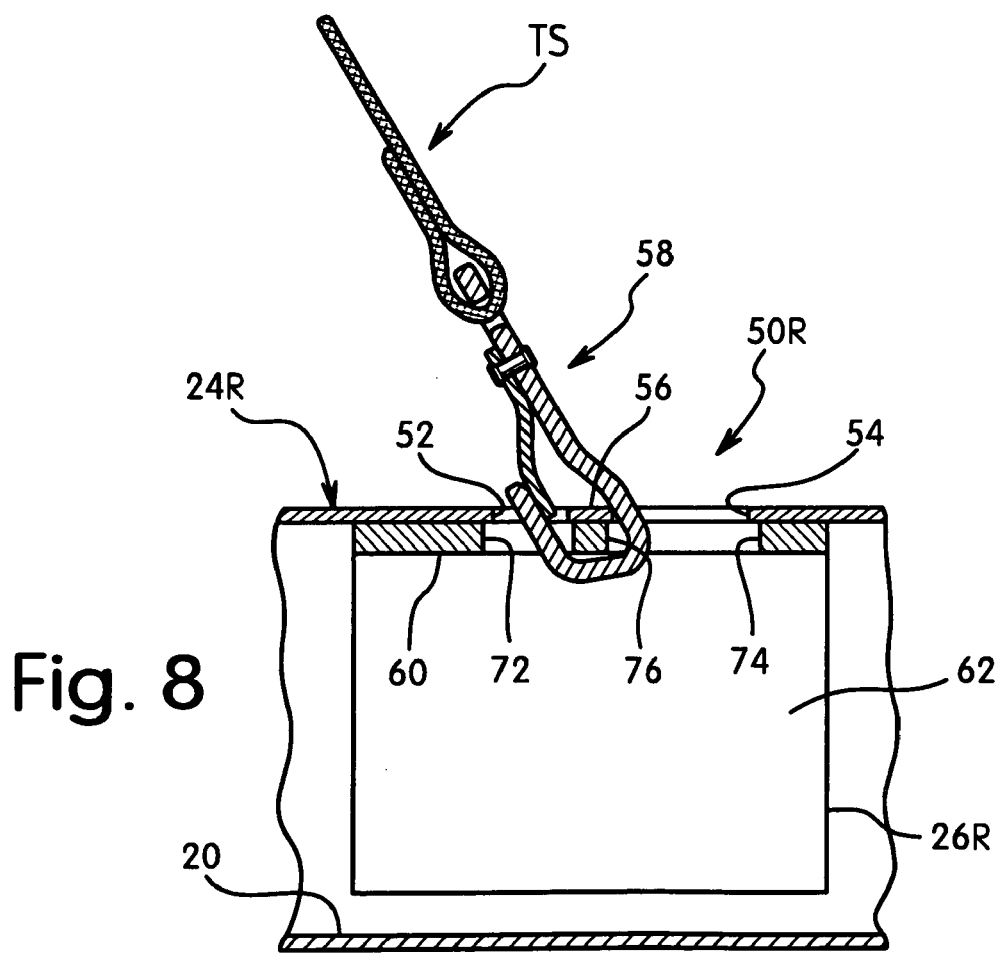
FIG. 8 is a simplified partial cross sectional view of the right side integrated child seat tether anchor, corresponding to FIG. 7, but with a child tether coupled thereto in accordance with the preferred embodiment.

The support portion 40 is a cabin facing portion of the side structural member 24R that is configured and arranged to form a first or right side integrated child seat tether anchor 50R. In particular, the support portion 40 is provided with a front opening 52 and a rear opening 54 that define a first bar portion 56 therebetween. The front and rear openings 52 and 54 and the first bar portion 56 are arranged and dimensioned to receive a conventional child seat tether clip 58 as seen in FIGS. 7 and 8. Preferably, the front opening 52 has a larger longitudinal dimension as measured in the front to aft vehicle direction then the corresponding longitudinal dimension of the rear opening 54. This arrangement allows to the child seat tether clip 58 to be easily fastened to the first bar portion 56 of the child seat tether anchor 50R.

The left side structural support member 24L has a second or left side integrated child seat tether anchor 50L which is arranged and dimensioned in the same manner as the child seat tether anchor 50R as discussed above. Thus, the integrated child seat tether anchor 50L is arranged and dimensioned to receive the child seat tether clip 58 in the same manner as the child seat tether anchor 50R shown in FIG. 8.

The side structural support members 24R and 24L are reinforced by the reinforcement plates 26R and 26L which form part of the integrated child seat tether anchors 50R and 50L. In particular, the reinforcement plate 26R includes a first horizontally extending reinforcement portion 60 and a second vertically extending reinforcement portion 62 such that the reinforcement plate 26R has a substantially L-shaped configuration. The reinforcement plate 26R is located in the space formed between the side structural member 24R and the floor panel 20. In particular, the reinforcement portion 60 overlies the support portion 40, while the reinforcement portion 62 overlies the support portion 42 of the side structural member 24R. The reinforcement portion 60 also has a front opening 72 and a rear opening 74 that define a second bar portion 76 therebetween that overlies the first bar portion 56. Thus, the first and second bar portions 56 and 76 are configured and arranged to receive the child seat tether clip 58 as seen in FIGS. 7 and 8. The front and rear openings 72 and 74 are preferably either identical or slightly larger in size and shape to the front and rear openings 52 and 54 of the side structural member 24R. Accordingly, the child seat tether anchors 50R and 50L are formed in the side structural support members 24R and 24L at the lateral sides of the floor panel 20 without the need of a separate anchor member that extends outwardly from the side structural support members 24R and 24L. In other words, the child seat tether anchors 50R and 50L of the present invention provide a vehicle child seat attachment structure that reduces production costs of the vehicle and eliminates the need for additional parts and/or additional assembly steps that are required to install the separate tether anchors.

Figure 9:
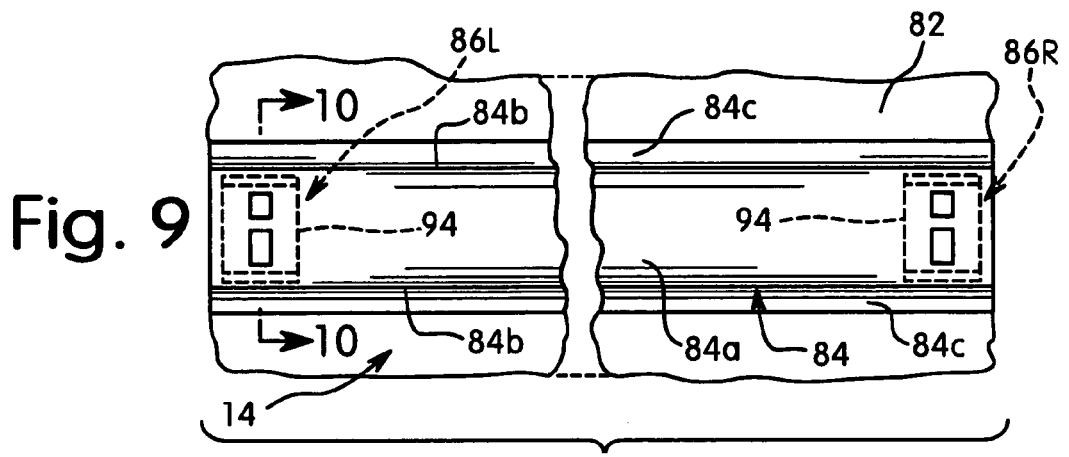
FIG. 9 is a simplified partial interior plan view of the roof structure of the vehicle body illustrated in FIGS. 1 and 2 in the area of the vehicle child seat tether anchor.
Figure 10:
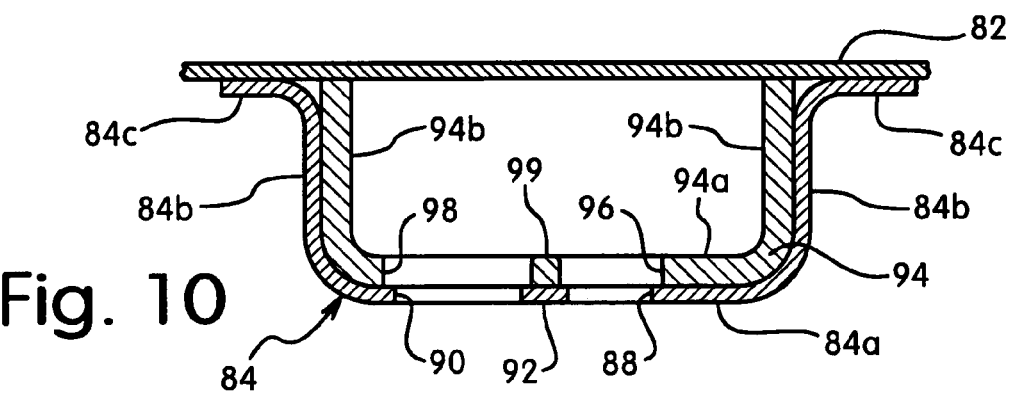
FIG. 10 is a simplified partial cross sectional view of the right side integrated child seat tether anchor in accordance with the preferred embodiment of the present invention as seen along section line 10—10 of FIG. 9.
Figure 11:
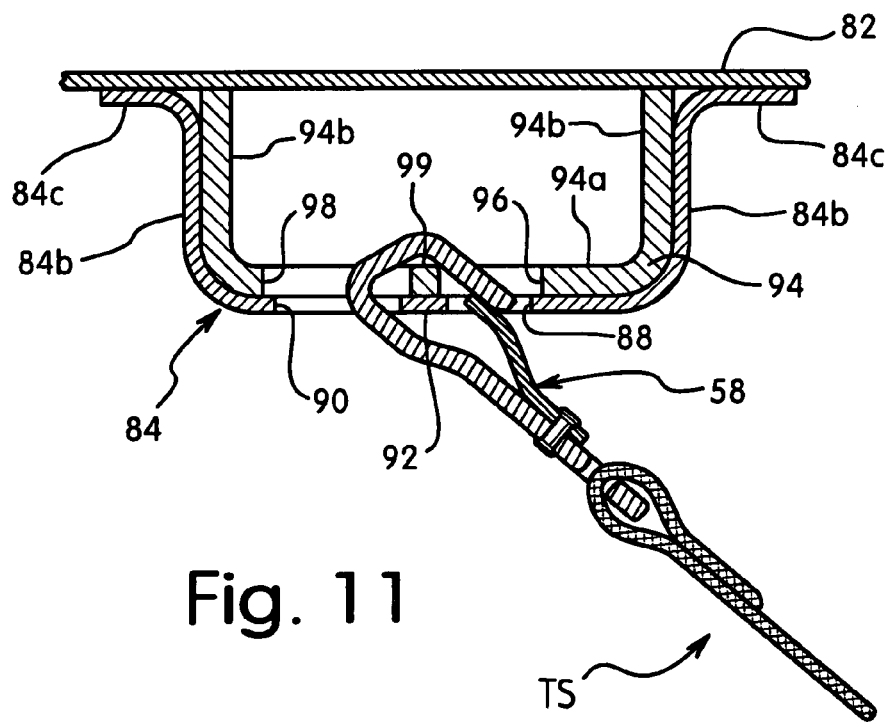
FIG. 11 is a simplified partial cross sectional view of the right side integrated child seat tether anchor, corresponding to FIG. 10, but with a child tether coupled thereto in accordance with the preferred embodiment.

Referring now to FIGS. 9–11, the child seat attachment structure 14 is basically formed by a portion of the roof structure 18 that at least includes a roof panel 82 and a cross (first) structural member 84 that extends in a side to side vehicle direction of the roof panel 82. For the sake of simplicity, the vehicle child seat attachment structure 14 will be illustrated with a simplified configuration. Moreover, it will be apparent to those skilled in the art from this disclosure that the child seat attachment structure 14 is dimensioned and configured to conform to the particular structure of the roof structure 18 to which is being formed as an integrated part. In other words, the precise dimensions and configurations of the child seat attachment structure 14 depend on the configuration of the roof structure 18 of the vehicle 10.

The roof panel 82 is preferably a one-piece, unitary member constructed from a single piece of sheet metal that is configured to form a roof portion of the vehicle body 10. The cross structural member 84 is located adjacent the rear edge of the roof panel 82. The cross structural member 84 is preferably a one-piece, unitary member constructed from a single piece of sheet metal that is configured to form a support member with generally U-shaped transverse cross section. In particular, the cross structural member 84 has a generally horizontally extending support portion 84a and a pair of substantially vertically extending support portions 84b. Preferably, each of the vertically extending support portions 84b has a lateral mounting flange 84c that is welded to the roof panel 82. Thus, the cross structural member 84 is a sheet metal structural member that is bent and welded to the roof panel 82 to extend in a side to side direction of the roof panel 82.

The horizontally extending support portion 84a is a cabin facing portion of the cross structural member 84 that is configured and arranged to form a pair of integrated child seat tether anchors 86R and 86L at the lateral ends of the cross structural member 84. In particular, each of the integrated child seat tether anchors 86R and 86L of the horizontally extending support portion 84a is provided with a front opening 88 and a rear opening 90 that define a first bar portion 92 therebetween. The front and rear openings 88 and 90 and the first bar portion 92 are arranged and dimensioned to receive the conventional child seat tether clip 58 as seen in FIG. 11. Preferably, the front opening 88 has a larger longitudinal dimension as measured in the front to aft vehicle direction then the corresponding longitudinal dimension of the rear opening 90.

The lateral ends of the cross structural member 84 are reinforced by a pair of reinforcement plates 94 which form part of the integrated child seat tether anchor 86R and 86L. In particular, each reinforcement plate 94 includes a first horizontally extending reinforcement portion 94a and a pair of second vertically extending reinforcement portions 94b such that the reinforcement plate 94 has a substantially U-shaped configuration. Of course, one of the second vertically extending reinforcement portions 94b can be eliminated as need and or desired.

The reinforcement plate 94 is located in the space formed between the cross structural member 84 and the roof panel 82. In particular, the reinforcement portion 94a overlies the support portion 84a, while the reinforcement portions 94b overlie the support portions 84b of the cross structural member 84. The reinforcement portion 94a also has a front opening 96 and a rear opening 98 that define a second bar portion 99 therebetween that overlies the first bar portion 99. Thus, the first and second bar portions 92 and 99 are configured and arranged to receive the child seat tether clip 58 as seen in FIG. 11. The front and rear openings 96 and 98 are preferably either identical or slightly larger in size and shape to the front and rear openings 88 and 90 of the cross structural member 84. Accordingly, the child seat tether anchors 86R and 86L are formed at the lateral ends of the cross structural member 84 without the need of a separate anchor member that extends outwardly from the cross structural member 84. In other words, the child seat tether anchors 86R and 86L of the present invention provide a vehicle child seat attachment structure that reduces production costs of the vehicle and eliminates the need for additional parts and/or additional assembly steps that are required to install the separate tether anchors.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least +5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle child seat attachment structure comprising:
   a vehicle body panel configured and arranged to conform to a contour of a portion of a vehicle cabin; and
   a first sheet metal structural member fixedly coupled to the vehicle body panel to create a space between the vehicle body panel and a cabin facing portion of the first sheet metal structural member;
   the cabin facing portion of the first sheet metal structural member being configured and arranged to form at least a first bar portion of an integrated child seat tether anchor that is arranged and dimensioned to receive a child seat tether clip.

2. The vehicle child seat attachment structure according to claim 1, wherein
   the vehicle body panel is a floor panel, and
   the first sheet metal structural member is a side structural member extending in a front to aft vehicle direction of the floor panel.

3. The vehicle child seat attachment structure according to claim 2, wherein
   the first sheet metal structural member has a reinforcement plate located within the space and attached to the cabin facing portion, the reinforcement plate being configured and arranged to form at least a second bar portion of the integrated child seat tether anchor that is arranged and dimensioned to overlie the first bar portion such that the child seat tether clip is fastened around the first and second bar portions.

4. The vehicle child seat attachment structure according to claim 2, wherein
   the floor panel has a wheel well attached to a side portion of the floor panel, and
   the first sheet metal structural member is attached to the wheel well.

5. The vehicle child seat attachment structure according to claim 4, wherein
   the floor panel, the wheel well and the first sheet metal structural member are configured and arranged to form the space between the vehicle body panel and the cabin facing portion of the first sheet metal structural member.

6. The vehicle child seat attachment structure according to claim 4, wherein
   the first sheet metal structural member has a substantially L-shaped transverse cross section with a first lateral edge fixed to the floor panel and a second lateral edge fixed to the wheel well.

7. The vehicle child seat attachment structure according to claim 6, wherein
   the first sheet metal structural member has a reinforcement plate located within the space and attached to the cabin facing portion, the reinforcement plate being configured and arranged to form at least a second bar portion of the integrated child seat tether anchor that is arranged and dimensioned to overlie the first bar portion such that the child seat tether clip is fastened around the first and second bar portions.

8. The vehicle child seat attachment structure according to claim 7, wherein
   the reinforcement plate has a substantially L-shaped transverse cross section.

9. The vehicle child seat attachment structure according to claim 7, wherein
   the first bar portion of the first sheet metal structural member is defined by front and rear openings that are spaced in the front to aft vehicle direction, and
   the second bar portion of the reinforcement plate is defined by front and rear openings that are spaced in the front to aft vehicle direction.

10. The vehicle child seat attachment structure according to claim 9, wherein
    the front openings are larger in the front to aft vehicle direction than the rear openings.

11. The vehicle child seat attachment structure according to claim 2, wherein
    the floor panel has a second additional sheet metal structural member that is a side structural member extending in the front to aft vehicle direction of the floor panel, and
    the second sheet metal structural member is fixedly coupled to the vehicle floor panel to create a space between the vehicle body panel and a cabin facing portion of the second sheet metal structural member,
    the cabin facing portion of the second sheet metal structural member being configured and arranged to form at least a first bar portion of an additional integrated child seat tether anchor that is arranged and dimensioned to receive an additional child seat tether clip.

12. The vehicle child seat attachment structure according to claim 1, wherein
    the vehicle body panel is a roof panel, and
    the first sheet metal structural member is a cross structural member extending in a side to side vehicle direction of the roof panel.

13. The vehicle child seat attachment structure according to claim 12, wherein
    the integrated child seat tether anchor is located generally in an area of one side portion of the roof panel.

14. The vehicle child seat attachment structure according to claim 12, wherein
    the first sheet metal structural member has a reinforcement plate located within the space and attached to the cabin facing portion, the reinforcement plate being configured and arranged to form at least a second bar portion of the integrated child seat tether anchor that is arranged and dimensioned to overlie the first bar portion such that the child seat tether clip is fastened around the first and second bar portions.

15. The vehicle child seat attachment structure according to claim 14, wherein
    the first sheet metal structural member and the reinforcement plate include angled portions that are arranged in an overlapping relationship.

16. The vehicle child seat attachment structure according to claim 14, wherein
    the first bar portion of the first sheet metal structural member is defined by front and rear openings that are spaced in a front to aft vehicle direction, and
    the second bar portion of the reinforcement plate is defined by front and rear openings that are spaced in the front to aft vehicle direction.

17. The vehicle child seat attachment structure according to claim 16, wherein
    the front openings are larger in the front to aft vehicle direction than the rear openings.

18. A method of manufacturing a vehicle child seat attachment structure on a vehicle comprising:
    forming a vehicle body panel that conforms to a contour of a portion of a vehicle cabin; and forming a first sheet metal structural member that is fixedly coupled to the vehicle body panel to create a space between the vehicle body panel and a cabin facing portion of the first sheet metal structural member; and forming an integrated child seat tether anchor in the cabin facing portion of the first sheet metal structural member such that the cabin facing portion of the first sheet metal structural member is configured and arranged to form at least a first bar portion of the integrated child seat tether anchor that is arranged and dimensioned to receive a child seat tether clip.

19. The method according to claim 18, wherein the integrated child seat tether anchor is formed in a side structural member extending in a front to aft vehicle direction of a floor panel.

20. The method according to claim 19, further comprising attaching a reinforcement plate to the cabin facing portion of the first sheet metal structural member within the space, the reinforcement plate being configured and arranged to form at least a second bar portion of the integrated child seat tether anchor that is arranged and dimensioned to overlie the first bar portion such that the child seat tether clip is fastened around the first and second bar portions.

21. The method according to claim 19, wherein the floor panel has a wheel well attached to a side portion of the floor panel, and the first sheet metal structural member is attached to the wheel well.

22. The method according to claim 21, wherein the floor panel, the wheel well and the first sheet metal structural member are configured and arranged to form the space between the vehicle body panel and the cabin facing portion of the first sheet metal structural member.

23. The method according to claim 21, wherein the first sheet metal structural member has a substantially L-shaped transverse cross section with a first lateral edge fixed to the floor panel and a second lateral edge fixed to the wheel well.

24. The method according to claim 19, wherein forming a second sheet metal structural member that is fixedly coupled to the vehicle body panel to create a space between the vehicle body panel and a cabin facing portion of the second sheet metal structural member; and forming an additional integrated child seat tether anchor in the cabin facing portion of the second sheet metal structural member such that the cabin facing portion of the second sheet metal structural member is configured and arranged to form at least a first bar portion of the additional integrated child seat tether anchor that is arranged and dimensioned to receive an additional child seat tether clip.

25. The method according to claim 18, wherein the integrated child seat tether anchor is formed in a cross structural member extending in a side to side vehicle direction of a roof panel.

26. The method according to claim 25, wherein the integrated child seat tether anchor is located generally in an area of one side portion of the roof panel.

27. The method according to claim 25, wherein attaching a reinforcement plate to the cabin facing portion of the first sheet metal structural member within the space, the reinforcement plate being configured and arranged to form at least a second bar portion of the integrated child seat tether anchor that is arranged and dimensioned to overlie the first bar portion such that the child seat tether clip is fastened around the first and second bar portions.

28. The method according to claim 27, wherein the first sheet metal structural member and the reinforcement plate include angled portions that are arranged in an overlapping relationship.

29. The method according to claim 28, wherein the first bar portion of the first sheet metal structural member is defined by front and rear openings that are spaced in the front to aft vehicle direction, and the second bar portion of the reinforcement plate is defined by front and rear openings that are spaced in a front to aft vehicle direction.

* * * * *